United States Patent Office 3,485,855
Patented Dec. 23, 1969

3,485,855
PURIFICATION OF SEMICARBAZONES OF 3β-ACYLOXY-Δ⁵-ANDROSTENE-17-ONES
Jorgen Hjort and Vladimir Hach, Vancouver, British Columbia, Canada, assignors to MacMillan Bloedel Limited, Vancouver, British Columbia, Canada
No Drawing. Filed Oct. 4, 1968, Ser. No. 765,038
Int. Cl. C07c 167/42, 169/24
U.S. Cl. 260—397.5                                6 Claims

ABSTRACT OF THE DISCLOSURE

Crude 3β-acyloxy-Δ⁵-androstene-17-one semicarbazones are purified by selectively dissolving out the impurities with lower esters of acetic acid.

BACKGROUND OF THE INVENTION

Field of invention

The present invention relates to the purification of certain steroid derivatives and, in particular, to a useful procedure for purifying the semicarbazone of 3β-acyloxy-Δ⁵-androstene-17-one of Formula 1:

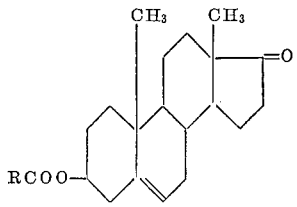

I

Description of prior art

It is known that an acylated sterol, for example cholesterol acetate or sitosterol acetate, can be oxidized using $CrO_3$ if the 5–6 double bond is first protected by bromine or chlorine addition. A variety of products is formed. They result mainly from the stepwise degradation of the aliphatic side chain in position 17 of the steroid nucleus. After dehalogenation of the crude oxidation mixture and removal of the acidic fraction using NaOH or by any other suitable method, a neutral fraction is obtained.

One of the most valued products in this fraction is the well known compound 3β-acyloxy-Δ⁵-androstene-17-one of the above Formula 1. This compound which is a valuable intermediate for the synthesis of a series of other pharmacologically important steroids, is isolated in the form of its semicarbazone.

The semicarbazone separates from the reaction mixture as a slightly soluble solid.

After precipitation, by cooling or otherwise, the semicarbazone contains impurities which must be removed and for this purpose various solvents have been proposed. These solvents include benzene, ether, and hexane.

However the solvents used are not very effective in removing impurities contained in the semicarbazone, especially when larger amounts, e.g. more than 25%, of these impurities are present. These impurities include neutral substances which do not form a semicarbazone and more soluble semicarbazones.

SUMMARY OF THE INVENTION

We have now discovered that lower acetic acid esters are very effective and convenient solvents for the purification of the above mentioned semicarbazone of a 3β-acyloxy-Δ⁵-androstene-17-one, especially in crude form.

DESCRIPTION OF PREFERRED EMBODIMENTS

Among suitable lower acetic acid esters there can be mentioned methyl, ethyl, propyl and butyl esters. Ethyl acetate and methyl acetate have been found to be particularly useful.

These esters have been found to selectively dissolve practically all impurities contained in a crude semicarbazone of a 3β-acyloxy-Δ⁵-androstene-17-one.

As the desired semicarbazone is only slightly soluble in the lower acetates, the losses in the purification according to the invention are negligible.

The invention is illustrated by the following non-limitative examples.

Example 1

10 grams of crude 3β-benzoyloxy-Δ⁵-androstene-17-one semicarbazone containing about 60% impurities, were suspended in 50 ml. of ethyl acetate at room temperature and stirred for 15 minutes. The physical appearance of the semicarbazone changed rapidly from a solid to a resinous consistency and then for a short time it appeared to be in solution. However, a solid formed quickly and the mixture was left in an ice-box overnight and without stirring. The semicarbazone was then filtered out, washed with a small amount of ethyl acetate and then dried at 50° C. The yield was 3.5 grams. The semicarbazone has a purity of about 90% as calculated from a comparison of its IR spectrum with that of a semicarbazone prepared from the purest 3β-benzoyloxy-Δ⁵-androstene-17-one. The spectral differences were practically nil.

Example 2

12.5 grams of crude 3β-acetyloxy-Δ⁵-androstene-17-one semicarbazone containing about 55% impurities were suspended in 60 ml. of methyl acetate and stirred for about 15 minutes at room temperature. The mixture was then left in an ice box overnight without stirring. The solid material was then filtered out, washed with methylacetate and dried at 50° C. The yield was 5.2 grams. The purified semicarbazone has a purity of about 93% as calculated from a comparison of its IR spectrum with that of a semicarbazone prepared from pure 3β-acetyloxy-Δ⁵-androstene-17-one.

What we claim as our invention is:
1. In a process for the production of a 3β-acyloxy-Δ⁵-androstene-17-one semicarbazone the improvement that comprises contacting the crude reaction mixture with a lower acetate and separating from the resulting mixture the purified semicarbazone.
2. A process as claimed in claim 1 in which the acetate is selected from the group consisting of methyl, ethyl, propyl and butyl acetates.
3. A process as claimed in claim 1 in which the acetate is methyl acetate.
4. A process as claimed in claim 1 in which the acetate is ethyl acetate.
5. A process as claimed in claim 1 in which the semicarbazone is 3β-benzyloxy-Δ⁵-androstene-17-one semicarbazone.
6. A process as claimed in claim 1 in which the semicarbazone is 3β-acetoxy-Δ⁵-androstene-17-one semicarbazone.

References Cited

UNITED STATES PATENTS 2,323,584   7/1943   Schoeller et al. _____ 260—397.4
2,387,469   10/1945   Ruzicka et al. _____ 260—397.5

ETHEL G. LOVE, Assistant Examiner

LEWIS GOTTS, Primary Examiner

U.S. Cl. X.R.

260—397.4